Figure 1:
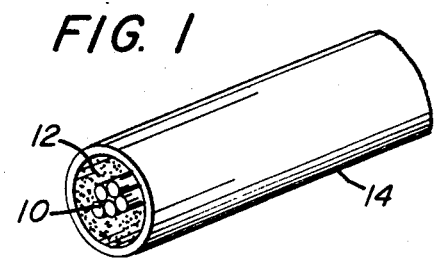

United States Patent [19]

Deminet et al.

[11] 4,314,741
[45] Feb. 9, 1982

[54] INTRUSION-FREE OPTICAL CABLE

[75] Inventors: Czeslaw Deminet; James F. Kenney, both of Kent, Wash.

[73] Assignee: The Boeing Company, Seattle, Wash.

[21] Appl. No.: 104,476

[22] Filed: Dec. 17, 1979

[51] Int. Cl.$^3$ .................................................. G02B 5/14
[52] U.S. Cl. ............................... 350/96.33; 350/96.30; 340/380
[58] Field of Search ............... 350/96.33, 96.29, 96.30, 350/96.32; 250/227; 340/380; 455/612

[56] References Cited

U.S. PATENT DOCUMENTS

| | | | |
|---|---|---|---|
| 4,000,416 | 12/1976 | Goell | 350/96.33 |
| 4,134,642 | 1/1979 | Kapron et al. | 350/96.33 |
| 4,174,149 | 11/1979 | Rupp | 350/96.33 |

*Primary Examiner*—Stewart J. Levy

*Attorney, Agent, or Firm*—Thomas H. Murray

[57] ABSTRACT

An intrusion-free optical cable of the type wherein one or more signal-carrying optical fibers are carried within an outer cladding which will self-destruct, with or without destruction of the inner signal-carrying fiber, in the event an attempt is made to penetrate the outer cladding and extract a signal. Self-destruction is sensed to indicate that an attempt has been made to penetrate the outer cladding. Various embodiments of the invention are shown including a cladding formed from tempered glass which will shatter when an attempt is made to penetrate it. In another embodiment, a laser is employed which directs a light beam through the cable. This light beam is of sufficient power to melt, or at least raise the temperature of, the cladding or fiber at a point where penetration is attempted such that the severance or rise in temperature can be detected.

8 Claims, 3 Drawing Figures

INTRUSION-FREE OPTICAL CABLE

BACKGROUND OF THE INVENTION

As is known, radio and unprotected point-to-point optical communication systems do not guarantee privacy since it is simple to detect and decode the radiated signal. Propagation by electrical signals in a wire, coaxial cable or waveguide likewise do not guarantee privacy since there is always some stray radiation and since it is relatively simple to tap into the electrical system. On the other hand, optical waveguides (i.e., fiber optics) offer greater privacy since there is no stray electromagnetic radiation. However, it is still possible to deliberately penetrate a cladding around the optical signal-carrying fiber or fibers and extract a signal unless the complete length of fiber cable is maintained secure. For example, the cladding may be removed at a point along the length of the cable without detection and a signal extracted by a probe. Various types of probes can be used such as a Tee-connection, a prism, the core of an optical fiber or an electro-optical detector.

In the past, encryption (i.e., secret coding) of the signal has been required to avoid interpretation. Encryption equipment, however, is costly and introduces additional data processing delays.

SUMMARY OF THE INVENTION

In accordance with the present invention, an intrusion-free optical cable is provided which does not require encryption of the signal. Rather, when an attempt is made to penetrate an outer sheath surrounding one or more signal-carrying optical cables, the system will shut down or self-destruct.

Preferably, the outer sheath is formed of tempered glass which will shatter when an attempt is made to penetrate it. The interior of the sheath can be subjected to pressure conditions, including vacuum, such that when it is broken by shattering, the resultant change in pressure can be detected at either end of the cable. Alternatively, an optical time-domain reflectometer can be used to detect the break and its location along the length of the cable.

In another embodiment of the invention, the outer cladding for the signal-carrying optical fiber or fibers is formed from material which will transmit light and is such that removal of part of the cladding will cause a change in local propagation conditions with higher local power absorption. By directing a laser beam along the length of the sheath which is of sufficient power to cause the cladding to rise in temperature at the point of removal, the sheath will either rise in temperature or melt to sever the cable. If the laser is pulsed, it can also serve as the input for a time-domain reflectometer.

Figure 2:
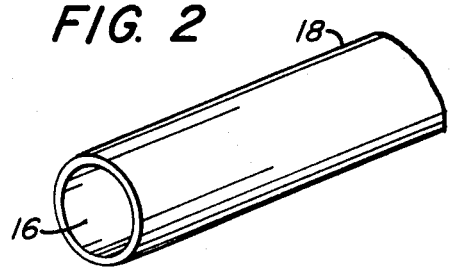
Figure 3:
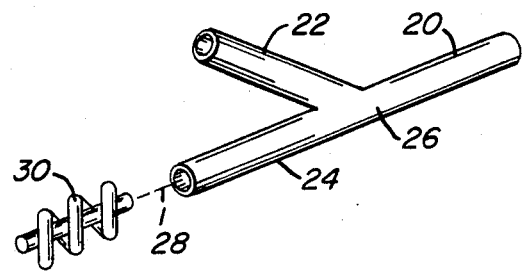

The above and other objects and features of the invention will become apparent from the following detailed description taken in connection with the accompanying drawings which form a part of this specification, and in which:

FIG. 1 is an illustration of one embodiment of the invention employing multiple signal-carrying optical fibers;

FIG. 2 is an illustration of an alternative embodiment of the invention wherein a single optical fiber is surrounded by an outer sheath which will self-destruct when an attempt is made to penetrate it; and FIG. 3 illustrates still another embodiment of the invention wherein a laser beam is employed to heat and/or melt an area of an outer protective sheath at a point where an attempt has been made to penetrate it.

With reference now to the drawings, and particularly to FIG. 1, there is shown a fiber optics cable comprising a bundle of optical fibers 10. These optical fibers may be in contact with one another as in a multifiber bundle, or optically separated by suitable cladding so each can carry a separate intelligence-modulated signal. The respective fibers in the bundle 10 are embedded within suitable cabling material such as KEVLAR (Trademark). Surrounding the fibers 10 and the buffer material 12 is an outer sheath 14 constructed in such a fashion that attempts to penetrate it will cause it to fail catastrophically. The sheath 14, for example, may comprise tempered glass produced by either thermal or chemical techniques. In the thermal technique, the sheath 14 is heated and is then air-quenched such that it will fracture readily whenever an attempt is made to penetrate it. In the chemical tempering process, such as that described in "Chemical Strengthening of Glass", Joseph S. Olcott, *Science*, Vol. 40, June 14, 1963, the sheath is passed through a hot lithium salt bath, for example, whereby the sodium in the outer layer of the glass is substituted for lithium in an ion-stuffing process. This results in a lithium glass on the outside of the sheath and a sodium glass on the inside. Here, again, as in the thermal technique, an attempt to penetrate the sheath 14 will cause it to rupture. The interior of the sheath may be pressurized so that any rupture can be detected by a drop in pressure at either end of the cable. Alternatively, optical techniques such as reflection or increased attenuation can be used at either end of the cable to detect the existence of the break and its location.

In FIG. 2, another embodiment of the invention is shown wherein a single optical fiber 16 is surrounded by and in contact with an outer protective sheath 18 which, again, may comprise tempered glass. Fiber 16 and the sheath 18 may be integral and the outer sheath 18 formed in the tempering process. Together they form an optical fiber with the required index-of-refraction conditions necessary to preserve internal reflection in the fiber. Hence, a step-index or graded-index approach may be used. This could be done on fiber 16, or alternatively, outer sheath 18 may also act as a cladding material. The invention is not limited by the type of optical fiber that is protected by the protective sheath. If an attempt is made to penetrate the cable by cutting through the outer sheath 18, the entire cable will immediately self-destruct. If an optical time-domain reflectometer is used in the system, the instant of failure can be detected as well as the initial location of the break. This information can then be used as an indicator of system failure as well as an alarm that can be used in apprehension of the intruder.

In FIG. 3, still another embodiment of the invention is shown which consists of a standard optical fiber communication link 20 that is spliced into two input branches 22 and 24 at a "T" or "Y" or other splice located at 26. In this embodiment, the signal can be introduced into the core of the fiber through the branch 22, for example, Directed into the other branch 24 and into the core is a light beam 28 from a high power laser schematically illustrated at 30. Unlike the embodiments of FIGS. 1 and 2, the communication link 20 is not provided with a self-destructing outer sheath of tempered glass but is a conventional step-index or graded-index fiber. Normally, the power loss along the inner core of the fiber will be very low; however attempts to extract the signal by removing part of the cladding will cause a local change in propagation conditions with consequently higher local power absorption. The power from the laser 30 is sufficiently high such that any spot absorption due to penetration of the cladding will cause sufficient energy absorption to melt the fiber at that spot, or to raise it to a high temperature. If the laser 30 is pulsed, it can also serve as the input for time-domain reflectometer apparatus. As soon as a large signal is returned to the input end from either a glowing fiber (i.e., of increased temperature) or a ruptured fiber due to intrusion attempts, the system can be shut down and attempts made to apprehend the intruder. In another embodiment of the invention, the high power laser light can be conducted along the cladding of the fiber rather than along the core. This will change the nature of the "T" or "Y" in FIG. 3 such that the signal is introduced to the core, and the laser light to the cladding. As will be appreciated, in any of the cases described in connection with FIG. 3 the fiber may be ruptured at the point of attempted entry due to the localized absorption of laser power, but the entire length of the fiber will not be destroyed. The severed lengths can then be spliced together.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. An intrusion-free optical cable for optical communication comprising at least one optical fiber adapted to carry an optical intelligence signal, and an outer cladding for said optical fiber formed of materials which will self-destruct when an attempt is made to penetrate it for the purpose of signal extraction from the optical fiber, the interior of said outer cladding being at a pressure other than the ambient pressure such that upon self-destruction of said cladding, a pressure change will occur within the interior of the cladding to indicate that a penetration has been made.

2. The intrusion-free optical cable of claim 1 wherein said outer cladding comprises tempered glass which will shatter when an attempt is made to penetrate it.

3. The instrusion-free optical cable of claim 1 including a plurality of optical signal-carrying fibers within said outer cladding.

4. The intrusion-free optical cable of claim 1 wherein said outer cladding is in abutment with a single inner optical signal-carrying fiber.

5. The intrusion-free optical cable of claim 1 including means for sensing a change in pressure inside said outer cladding upon the occurrence of self-destruction of said cladding.

6. An intrusion-free optical cable for optical communication comprising at least one optical fiber adapted to carry an optical intelligence signal, an outer cladding for said optical fiber formed from material which will transmit light and in which removal of part of the cladding will cause a change in local propagation conditions with higher local power absorption, and means including a laser for directing a light beam along said cladding, said light beam being of sufficient power to cause the cladding to rise in temperature at the point of removal.

7. The intrusion-free optical cable of claim 6 wherein the light beam is of sufficient power to cause at least a part of the cable to melt at the point of removal.

8. The intrusion-free optical cable of claim 6 wherein said beam of light from said laser is injected into said cladding through a coupling selected from a "T" coupling and a "Y" coupling.

* * * * *